(12) United States Patent
 Esser

(10) Patent No.: US 11,130,400 B2
(45) Date of Patent: *Sep. 28, 2021

(54) FUEL TANK MADE OF THERMOPLASTIC MATERIAL

(71) Applicant: KAUTEX TEXTRON GMBH & CO. KG, Bonn (DE)

(72) Inventor: Klaus Esser, Konigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 433 days.

This patent is subject to a terminal disclaimer.

(21) Appl. No.: 15/966,714

(22) Filed: Apr. 30, 2018

(65) Prior Publication Data

US 2018/0312057 A1  Nov. 1, 2018

Related U.S. Application Data

(63) Continuation of application No. 13/812,826, filed as application No. PCT/EP2011/003248 on Jun. 30, 2011, now Pat. No. 9,956,869.

(30) Foreign Application Priority Data

Jul. 26, 2010 (DE) ..................... 10 2010 032 278.4

(51) Int. Cl.
 *B60K 15/077* (2006.01)
 *B60K 15/03* (2006.01)
 (Continued)

(52) U.S. Cl.
 CPC ............ *B60K 15/077* (2013.01); *B29C 48/07* (2019.02); *B29C 65/609* (2013.01);
 (Continued)

(58) Field of Classification Search
 CPC ........ B60K 15/077; B60K 2015/03467; B60K 2015/0775; B65D 90/52
 See application file for complete search history.

(56) References Cited

U.S. PATENT DOCUMENTS 2,374,332 A * 4/1945 Crawford ............... B64D 37/06
 220/560.02
2,678,660 A   5/1954 Gurin
 (Continued)

FOREIGN PATENT DOCUMENTS

CN       201501295       6/2010
DE       10260952        7/2004
 (Continued)

OTHER PUBLICATIONS

Chinese search report dated Jan. 23, 2015, received in related Chinese Appln. No. 2011800350584.
 (Continued)

*Primary Examiner* — Andrew T Kirsch
(74) *Attorney, Agent, or Firm* — Grossman, Tucker, Perreault & Pfleger, PLLC

(57) ABSTRACT

Fuel tank made of thermoplastic material comprising baffle components provided therein in the form of at least one baffle element (2) comprising at least one wall portion (4) which is clamped approximately centrally and/or at the end, so that said wall portion may perform relative movements in relation to the tank, caused by splashing movements of the fuel, at least one fastening foot being provided for the clamping, the base thereof being provided with at least one through-hole, through which the fastening foot is riveted and/or welded to the tank wall (2).

20 Claims, 4 Drawing Sheets

(51) Int. Cl.
| | |
|---|---|
| *B29C 48/07* | (2019.01) |
| *B29C 65/60* | (2006.01) |
| *B29C 65/00* | (2006.01) |
| *B29C 48/305* | (2019.01) |
| *B29C 49/04* | (2006.01) |
| *B29C 65/02* | (2006.01) |
| *B29K 23/00* | (2006.01) |
| *B29L 31/00* | (2006.01) |
| *B29C 48/08* | (2019.01) |
| *B29C 48/09* | (2019.01) |

(52) U.S. Cl.
CPC ........ *B29C 66/1122* (2013.01); *B29C 66/532* (2013.01); *B29C 66/61* (2013.01); *B29C 66/723* (2013.01); *B29C 66/7392* (2013.01); *B29C 48/08* (2019.02); *B29C 48/09* (2019.02); *B29C 48/305* (2019.02); *B29C 49/04* (2013.01); *B29C 65/02* (2013.01); *B29C 66/71* (2013.01); *B29C 66/7234* (2013.01); *B29C 66/73921* (2013.01); *B29C 66/8322* (2013.01); *B29K 2023/065* (2013.01); *B29L 2031/7172* (2013.01); *B29L 2031/737* (2013.01); *B60K 15/03177* (2013.01); *B60K 2015/0344* (2013.01); *B60K 2015/03453* (2013.01); *B60K 2015/0775* (2013.01)

(56) References Cited

U.S. PATENT DOCUMENTS

| | | |
|---|---|---|
| 2,860,809 A | 11/1958 | Perry |
| 4,444,979 A | 4/1984 | St.Clair et al. |
| 4,844,278 A | 7/1989 | Freiwald et al. |
| 5,308,427 A * | 5/1994 | Duhaime ............... B29C 65/56 156/245 |
| 6,220,287 B1 | 4/2001 | Wolf |
| 6,408,874 B1 | 6/2002 | Keller |
| 6,736,282 B2 | 5/2004 | Krogull |
| 8,122,604 B2 | 2/2012 | Jannot et al. |
| 2008/0006625 A1 | 1/2008 | Borchert et al. |
| 2010/0139842 A1 | 6/2010 | Criel et al. |
| 2010/0224440 A1 | 9/2010 | Fujii |

FOREIGN PATENT DOCUMENTS

| | | |
|---|---|---|
| DE | 102006059799 | 6/2008 |
| JP | S5772323 | 5/1982 |
| JP | S58202112 | 11/1983 |
| JP | 59196320 | 11/1984 |
| JP | 63176720 | 7/1988 |
| JP | S641517 | 1/1989 |
| JP | 2006248367 | 9/2006 |
| KR | 100712411 | 4/2007 |
| KR | 1020080010494 | 1/2008 |
| KR | 1020090060809 | 6/2009 |
| WO | 2010023267 | 3/2010 |

OTHER PUBLICATIONS

International Search Report and Written Opinion from related PCT Appln. No. PCT/EP2011/003248, dated Feb. 22, 2012.

* cited by examiner

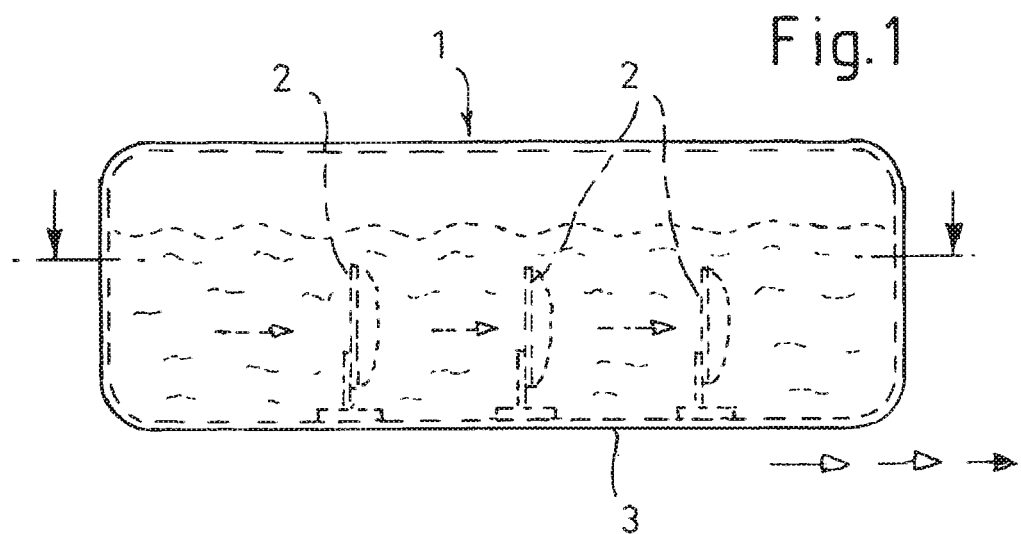
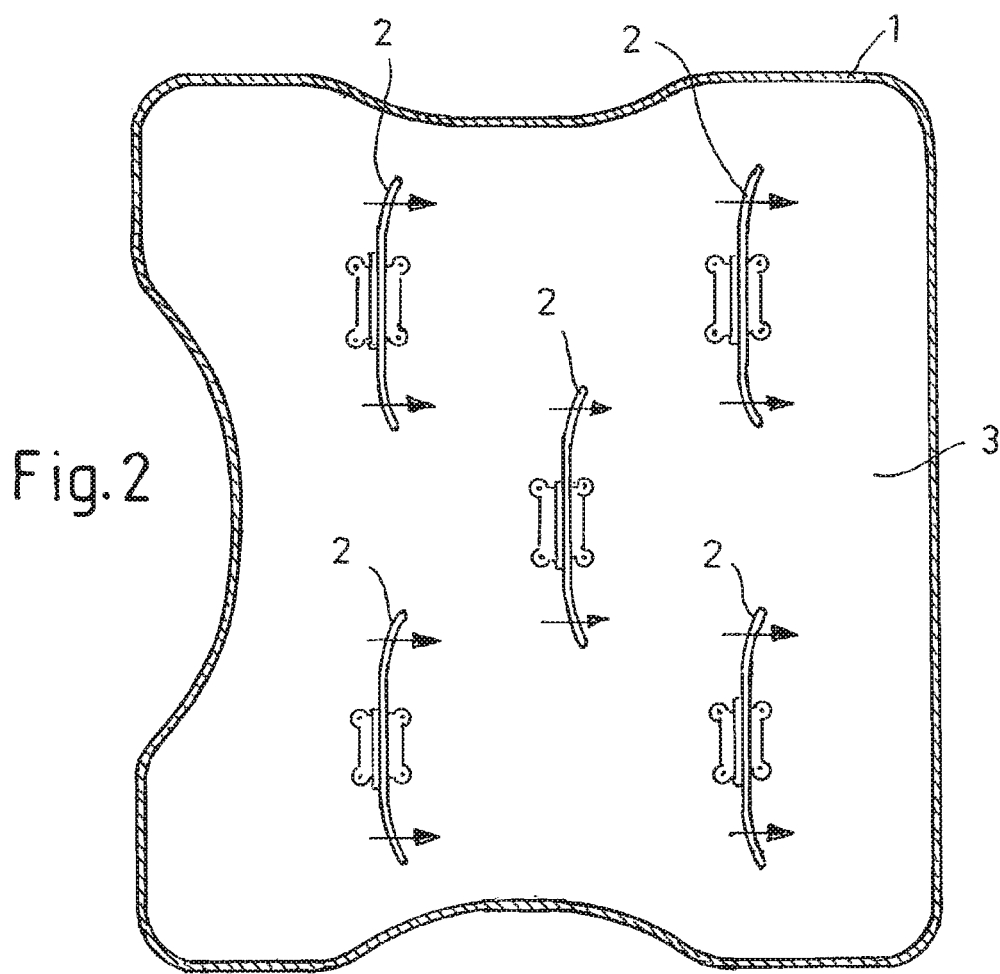

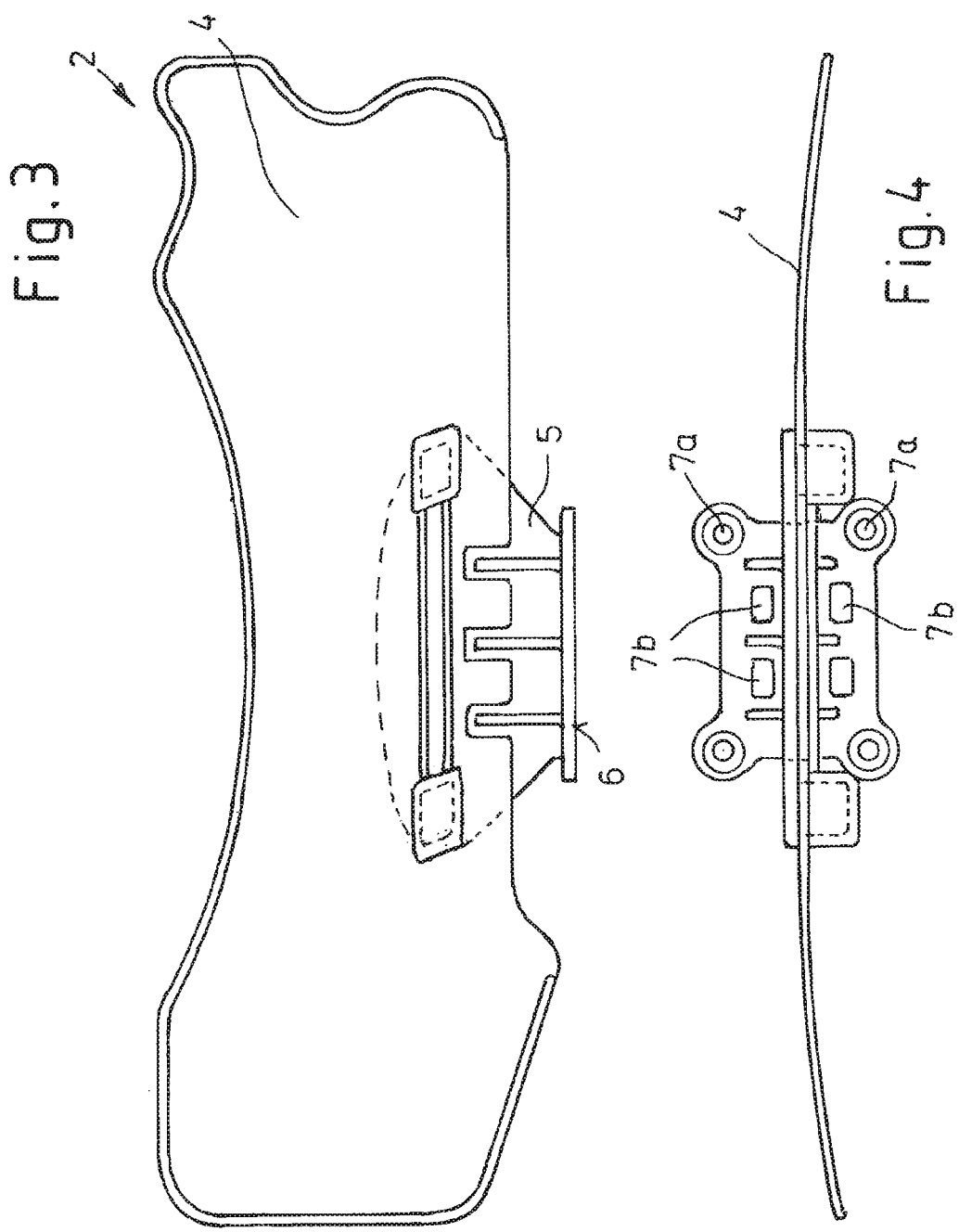

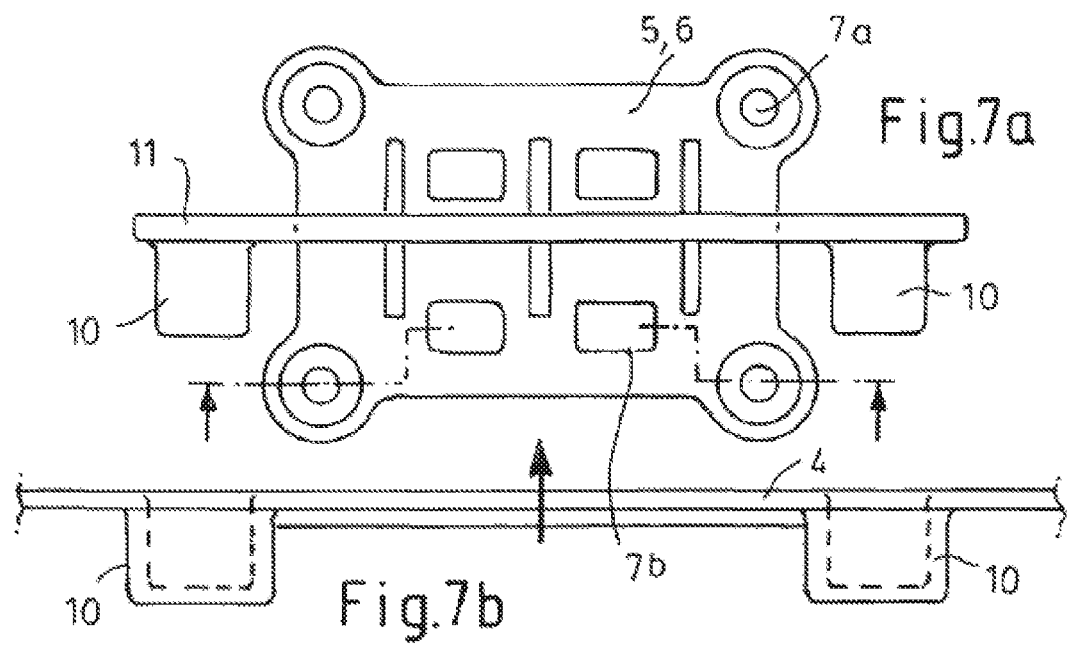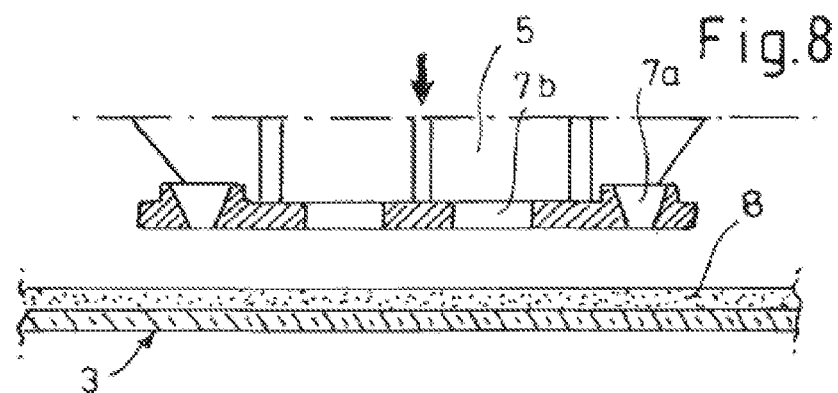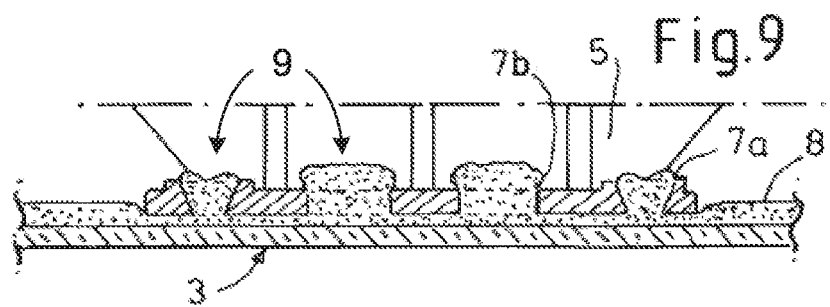

FUEL TANK MADE OF THERMOPLASTIC MATERIAL

The invention relates to a fuel tank made of thermoplastic material comprising at least one baffle element incorporated therein.

In fuel tanks for motor vehicles, measures for preventing splashing noise and/or sloshing noise produced by fuel sloshing to and fro, caused by the driving dynamics of the motor vehicle, play an increasingly important role and namely, in particular, because modern passenger vehicles are becoming quieter due to improved engine encapsulation and improved internal combustion engines. In particular, in hybrid vehicles in which the internal combustion engine of the motor vehicle is not in operation over long driving cycles, background noise occurs particularly in the motor vehicle. With alternate cornering or when accelerating and decelerating the motor vehicle, depending on the filling state of the tank and the tank geometry, greater volumes of fuel are moved to and fro due to the inertia of the fuel inside the fuel tank. The impact of fuel splashing against fixed components of the fuel tank or even the surrounding walls of the tank may occasionally represent a source of disturbing noise.

In order to prevent this, it is known to incorporate annular or even labyrinth-type baffle components in the fuel tank. Said baffle components are generally arranged so that they deflect or slow down the flow of fuel in the fuel tank so as to minimize noise.

For example, so-called baffle rings have proved particularly advantageous, said baffle rings being configured as closed profiled portions extending between the opposing tank walls so that said baffle rings form flow channels between the surrounding walls of the fuel tank in the volume thereof, which produce a substantially directed fuel flow so that a front impact of fuel splashing onto an obstruction extending substantially transversely to the direction of movement, occurs as little as possible. During the production of the fuel tank, it is possible for such baffle rings to have been already integrally formed therein, for example by blow moulding or by introducing into open half-shells made of thermoplastic material, which are joined together to form a closed tank. It is also known to arrange such baffle rings through the inspection opening provided in the fuel tank for retrospectively receiving a conveyor module in the tank, i.e. after the manufacture thereof, during the manufacture or in the course of a retrofitting measure. The baffle elements extending substantially between the large opposing tank walls may, for example by utilizing a resilient restoring movement, be clamped or supported against the tank wall. The anchoring of such baffle elements in the fuel tank generally plays a secondary role due to the geometry thereof.

It is also known, during the extrusion blow-moulding of fuel tanks, initially to introduce interconnected baffle structures in the manner of a ship in a bottle into the tube which has been extruded during production and to arrange and anchor said baffle structures in the product widened in the tool.

The known baffle components are generally all more or less related structures which are effective in terms of flow technology, which extend over a substantial part of the height and even over a substantial part of the width of the relevant fuel tank. The effect of said baffle components is to increase the weight and, as a whole, to rigidify the tank which is a drawback in the event of an accident.

Accordingly, it would be desirable to use baffle elements at any point in the tank, in a targeted and economical manner, so that the particular flow conditions in the tank and the geometry of the tank are taken into account.

The object of the invention, therefore, is to provide a fuel tank made of thermoplastic material comprising baffle components provided therein, which takes this requirement into consideration.

The object is achieved by a fuel tank made of thermoplastic material comprising baffle components provided therein in the form of at least one baffle element comprising at least one wall portion which is retained approximately centrally and/or at the end, at least so that said wall portion may perform relative movements in relation to the tank, caused by splashing movements of the fuel, at least one fastening foot being provided for the retention, the base thereof being provided with at least one through-hole, through which the fastening foot is riveted and/or welded to the tank wall.

The wall portion of the baffle element of the fuel tank according to the invention preferably extends over only one part of the height and width of the fuel tank. To this end, it is provided to connect said wall portion by a material connection and/or positive connection via a fastening foot to the tank wall.

In particular, the baffle element is intended to act inside the fuel tank according to the invention as a "flow brake", the flexible clamping thereof inside the fuel tank acting in an energy-consuming manner. The energy of the fuel splashing inside the tank is converted into deformation energy of the wall portion of the baffle element, which is able to be clamped either at one end or at both ends or approximately centrally. The wall portion of the baffle element may be configured to be closed, but may also have through-holes. The relevant wall portion is expediently configured as a flexible wing which is anchored in the region of its clamped point to the tank wall, so that the energy of the splashing fuel may be converted into deformation energy.

The through-hole of the fastening foot may be passed through by the material of the tank wall, the material passing through the through-hole forming a rivet head which retains the fastening foot. The fastening foot and the through-hole provided therein may be configured so that, when introducing the baffle element into the tank during the moulding thereof, the plasticized tank wall passes through the through-hole and/or when the fastening foot is positioned on the warm-plastic tank wall, the material of the tank wall is driven through the through-hole and thus forms a rivet head "in situ". The rivet head may be produced by a correspondingly advantageous cross-sectional shape of the through-hole. Said rivet head may, however, also have been produced by a tool when introducing the baffle element into the fuel tank.

This is, for example, particularly simple to provide if the fuel tank has been produced in a multi-part tool by extrusion blow-moulding of planar, web-like preforms which have been moulded in a blow-moulding tool in a first method step to form shell-shaped semi-finished products, in a second method step baffle components having been arranged in the still warm-plastic shells in the tool, and in a third method step the shells provided with insert parts being joined together and welded together to form a substantially closed fuel tank.

In an alternative variant of the fuel tank according to the invention, it is provided that the through-hole is passed through by a rivet pin with an integrally formed rivet head, the rivet pin being welded to the tank wall. To this end, for example, it may be provided to introduce a rivet pin made of thermoplastic material, which is compatible in the sense of weldability to the tank wall, into the through-hole of the fastening foot and to weld it to the tank wall in the still warm-plastic state of the tank wall. This may take place by utilizing the melt heat of the tank wall but also by introducing additional welding energy.

In a further alternative embodiment of the fuel tank according to the invention, it is provided that the through-hole is passed through by an additional welding material extruded therein, which in its composition approximately corresponds to the composition of the tank wall, and as a result is compatible therewith for the purpose of welding. Preferably, the fastening foot is provided with a base which has a plurality of through-holes.

In a particularly expedient embodiment of the fuel tank according to the invention, the wall portion of the baffle element may be configured as an elastically deformable wing which is clamped in the region of the retention thereof so that in this region the deformability is restricted.

Particularly preferably, the wall portion of the baffle element in the installed position of the fuel tank extends approximately transversely to the direction of travel and permits a deformation caused by the splashing movement of the fuel, in or counter to the direction of travel.

The baffle element according to the invention may, for example, be configured in two parts, the wall portion of the baffle element being latched to the fastening foot.

It is advantageous if inside the fuel tank a plurality of baffle elements are arranged in a suitable layout, for example said baffle elements may be fastened to a tank wall, arranged in several rows offset relative to one another.

As already mentioned above, one or more baffle elements may be configured so that they extend only over one part of the inside height and only over one part of the inside width of the tank volume.

Expediently, during the moulding of the fuel tank the baffle element is welded and/or riveted to the tank wall in one operation.

The fastening foot and the wall portion of the baffle element may consist of thermoplastic material, the material of the fastening foot preferably having a greater bending stiffness than that of the wall portion.

Both the fastening foot and the wall portion may consist of HDPE which, for example, may be welded to the HDPE-based tank wall. Within the scope of the invention, however, the foot element, in particular, may be configured from a different plastics material of greater bending stiffness or even of metal.

The invention is described hereinafter with reference to an exemplary embodiment shown in the drawings, in which:

FIG. 1 shows a cross section through a fuel tank according to the invention,

FIG. 2 shows a section along the lines II-II in FIG. 1,

FIG. 3 shows a side view of a baffle element,

FIG. 4 shows a plan view tilted by 90° of the baffle element shown in FIG. 3,

FIG. 5 shows the view of a front face of the baffle element shown in FIG. 3,

FIGS. 8 & 9 show schematic views which illustrate the fastening of the fastening foot to the tank wall.

Figure 6:
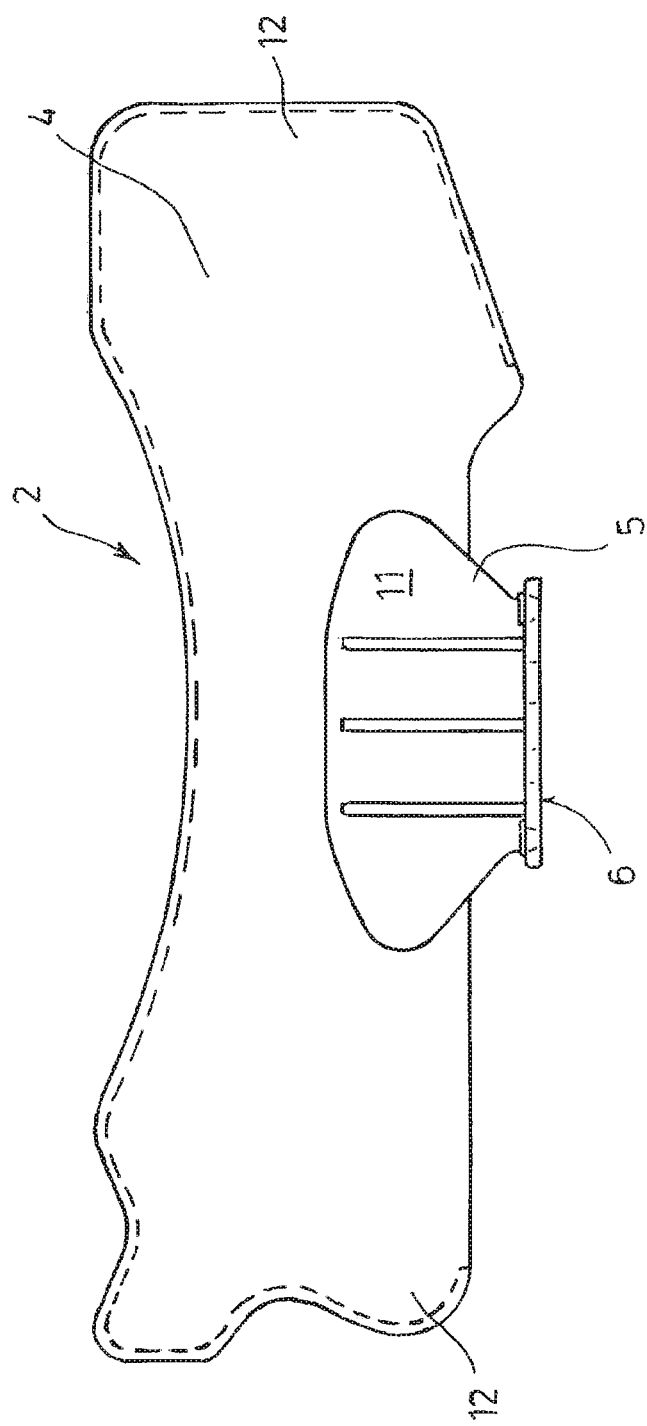
FIG. 6 shows a view corresponding to FIG. 3 of the side of the baffle element concealed in FIG. 3, FIGS. 7a & 7b show an exploded view of the fastening element with the wall portion to be fastened thereto

The fuel tank 1 shown in FIG. 1 comprises the conventional functional components for operating a fuel tank, such as the filling state sensor, de-aerating valves and venting valves, a conveyor unit with fuel pump, etc. Moreover, said fuel tank comprises a filler pipe and other tank interfaces which are not shown for reasons of simplicity. In the fuel tank 1, baffle components in the form of baffle elements 2 are arranged which are connected by a material and/or positive connection to the lower tank wall 3 in the installed position. Within the scope of the invention, the baffle elements 2 may also be connected to the upper tank wall in the installed position.

The baffle elements 2 are, for example, arranged in several rows offset relative to one another inside the fuel tank 1, as shown in FIG. 2. Said baffle elements have been introduced into the tank during and/or directly after the moulding of the fuel tank 1. The position and arrangement thereof is freely selected, irrespective of any inspection openings in the fuel tank 1.

The production of the fuel tank 1 according to the invention takes place by extrusion blow-moulding of web-like or sheet-like preforms which either have been obtained by cutting off an extruded tube or by extruding a thermoplastic material through sheet dies. The extrudate and thus also the tank wall 3 of the multi-layered fuel tank 1 consist of a six-layered co-extrudate based on HDPE with at least one barrier layer for hydrocarbons.

The web-like or sheet-like preforms are moulded inside a three-part moulding tool comprising two outer moulds, in each case comprising a cavity and a central tool to form a plastics hollow body. In this case, initially the web-like preforms are moved into the multi-part, open tool, and namely between the outer moulds and a central mould arranged therebetween and/or a central tool arranged therebetween. The outer moulds describe in each case a part of the contour of the product and form together a closed mould cavity. Initially, the outer moulds are closed against the central tool with the interposition of the preforms and then the preforms by the application of differential pressure are placed against the cavities of the blow-moulding tools. Via the central tool which, for example, may comprise component carriers and other devices, insert parts such as for example the aforementioned baffle elements 2 are fastened to the tank walls moulded in the cavities, and namely preferably by utilizing the extrusion heat of the still hot melt material and/or melt heat of the tank wall.

The advantages of this production method result, in particular, in combination with the baffle elements 2 according to the invention. This production method permits a fastening of the baffle elements 2 to at least one tank wall in any suitable layout, as is described below in more detail.

At this point it should be mentioned that the baffle elements 2 naturally are also arranged on opposing tank walls 3, so that said baffle elements protrude alternately from the top and from the bottom into the tank volume.

Each baffle element 2 comprises a substantially flexible wall portion 4 and a fastening foot 5, which may both consist of thermoplastic material, for example an HDPE.

In the exemplary embodiment shown, the fastening foot 5 is latched approximately centrally to the wall portion 4, so that said wall portion in the installed position forms a central clamping of the baffle element. The fastening foot 5 preferably consists of a thermoplastic material which has a greater bending stiffness than the wall portion 4 which, as will be described in more detail below, forms a flexible paddle. The greater bending stiffness of the fastening foot 5 may either be achieved via the type of material or via the material thickness.

The fastening foot 5 has a base 6 which is provided with through-holes 7. Some of these through-holes 7 are configured as funnel-shaped bores 7a, whereas other through-holes are configured as rectangular apertures 7b.

As is visible, for example, from FIGS. 8 and 9, the base 6 of the fastening foot 5 during the introduction of the baffle elements 2 in the fuel tank 1 is applied by pressure onto the still hot melt material of the tank wall 3, so that the inner layer 8 of the tank wall 3 is driven through the through-holes 7a, 7b, and at least in the region of the bores 7a undergoes a widening in the manner of a rivet head. This swelling of the material such that the bores 7a are engaged from behind, may either be promoted by the contour of the bores 7a or be produced by a tool during production, similar to the production of a conventional rivet connection. The material of the rivets thus formed is completely driven through from the inner layer 8 of the tank wall 3. As already mentioned above, instead of such riveting in situ, riveting by means of prefabricated rivets made of thermoplastic material may also be provided.

As may be derived, in particular, from FIGS. 3 and 4 in combination with FIG. 7, the baffle elements 2 are configured in two parts, the flexible wall portion 4 being latched and/or clipped via latching connections 10 to a support surface 11 of the fastening foot 5 extending approximately perpendicular to the base 6. In the installed position, the fastening foot 5 forms a central clamping of the flexible wall portion 4, the free ends 12 thereof being able to be deflected through the movement of the splashing fuel, as shown by way of indication by the arrows in FIG. 2, relative to the fixedly arranged fastening foot 5. The baffle elements 2 and the fastening foot 5 may naturally also be configured integrally/in one piece.

By "flexible" in the meaning of the invention is understood that the length and wall thickness and the nature of the material of the wall portions 4 of the baffle elements 2 are dimensioned so that the free ends 12 of the wall portions 4 may be deflected by the energy of the splashing fuel, so that the splashing movements of the fuel are converted into deformation energy of the wall portions 4.

LIST OF REFERENCE NUMERALS

1 Fuel tank
2 Baffle elements
3 Tank wall
4 Wall portion
5 Fastening foot
6 Base
7 Through-holes
7a Bores
7b Aperture
8 Inner layer
9 Rivets
10 Latching connection
11 Support surface
12 Ends

What is claimed is:

1. A fuel tank for a motor vehicle comprising:
at least one baffle element within a volume of the fuel tank, wherein the fuel tank is a thermoplastic fuel tank,
the at least one baffle element comprising a wall portion retained to a wall of the fuel tank by a fastening foot,
wherein, when fuel is in the fuel tank, the wall portion deforms in response to movements of the fuel in the fuel tank,
wherein the fastening foot comprises at least one through-hole used to fasten the fastening foot to the wall of the fuel tank,
wherein the at least one baffle element is configured such that, in its entirety, the at least one baffle element extends only over one part of an inside height and only over one part of an inside width of the volume of the fuel tank,
wherein the wall portion is formed of thermoplastic material,
wherein the fastening foot is formed of thermoplastic material, and
wherein the fastening foot has a greater bending stiffness than the wall portion.

2. The fuel tank according to claim 1, wherein:
the wall portion comprises a flexible wing which elastically deforms in response to the movements of the fuel in the fuel tank, and a region of retention which is retained by the fastening foot.

3. The fuel tank according to claim 1, wherein:
when the fuel is in the fuel tank, the thermoplastic material of the fastening foot is exposed to the fuel within the fuel tank.

4. The fuel tank according to claim 1, wherein:
the fastening foot is fastened to a region of an inner side of the wall of the fuel tank, and
when the fuel is in the fuel tank, the inner side of the wall of the fuel tank is exposed to the fuel.

5. The fuel tank according to claim 1, wherein:
the fastening foot is welded and/or riveted to the wall of the fuel tank.

6. The fuel tank according to claim 1, wherein:
the fastening foot is riveted to the wall of the fuel tank through the at least one through-hole.

7. The fuel tank according to claim 1, wherein:
the fastening foot is welded to the wall of the fuel tank through the at least one through-hole.

8. The fuel tank according to claim 1, wherein:
the wall portion and the fastening foot are fastened directly to each other.

9. The fuel tank according to claim 1, wherein:
the wall portion and the fastening foot form a latching connection.

10. The fuel tank according to claim 1, wherein:
the wall portion is disposed in a clamp of the fastening foot.

11. The fuel tank according to claim 1, wherein:
the wall portion is latched to the at least one fastening foot.

12. The fuel tank according to claim 1, wherein:
the at least one through-hole is used to rivet and/or weld the fastening foot to the wall of the fuel tank.

13. The fuel tank according to claim 1, wherein:
the at least one through-hole is occupied by thermoplastic material of the fuel tank.

14. The fuel tank according to claim 13, wherein:
the thermoplastic material of the fuel tank is from the wall of the fuel tank.

15. The fuel tank according to claim 13, wherein:
the thermoplastic material of the fuel tank forms a head to retain the fastening foot to the wall of the fuel tank.

16. The fuel tank according to claim 1, wherein:
the at least one through-hole is occupied by a pin fastened to the wall of the fuel tank.

17. The fuel tank according to claim 1, wherein:
the at least one through-hole is occupied by a material composition which is compatible with thermoplastic material of the wall of the fuel tank with respect to welding.

18. The fuel tank according to claim 1, wherein:
the wall portion, in an installed position of the fuel tank in the motor vehicle extends approximately transversely to a direction of movement of fuel in the fuel tank.

19. The fuel tank according to claim 1, wherein:
the at least one through-hole of the fastening foot comprises a plurality of through-holes, and the plurality of through-holes are each used to fasten the fastening foot to the wall of the fuel tank.

20. The fuel tank according to claim 1, wherein:
the at least one baffle element comprises a plurality of baffle elements, with each baffle element of the plurality of baffle elements comprising a wall portion retained to the wall of the tank by a fastening foot, respectively.

* * * * *